United States Patent Office 2,859,216
Patented Nov. 4, 1958

2,859,216

PROCESS FOR THE PREPARATION OF PIPERAZINE DERIVATIVES

Dexter B. Pattison, Wilmington, Del., assignor to E. I. du Pont de Nemours and Company, Wilmington, Del., a corporation of Delaware No Drawing. Application June 26, 1956
Serial No. 593,826

6 Claims. (Cl. 260—268)

This invention relates to new dinitriles carrying two tertiary amino groups and methods of providing them. More specifically it relates to N,N'-bis-(omega-cyano-n-alkyl)-piperazines in which the cyanoalkyl group contains more than three carbon atoms. Still more specifically it relates to N,N'-bis-(4-cyano-n-butyl)-piperazine. The nitriles of this invention are unique in that on hydrogenation they give diamines of sufficient stability for use in the preparation of high molecular weight, fiber-forming polycarbonamides which are sensitive to acid dyes.

Heretofore, N,N' - bis - (omega - cyano - n - alkyl)- piperazines in which the cyanoalkyl groups contain more than three carbon atoms have not been known. Van Dorp (Rec. trav. chim., 28, 81–5 (1909)) describes the preparation of N,N'-bis-(cyanomethyl)-piperazine by reaction of piperazine with hydrogen cyanide and formaldehyde. Roh and Wolff (German Patent 641,597 (1937)) disclose the synthesis of N,N'-bis-(2-cyanoethyl)-piperazine from acrylonitrile and piperazine.

The object of this invention is provision of N,N'-bis-(omega-cyano-n-alkyl)-piperazines which carry two tertiary nitrogen atoms and in which the cyanoalkyl groups contain more than 3 carbon atoms. More specifically its object is N,N'-bis-(4-cyano-n-butyl)-piperazines.

It is another object of this invention to provide a novel process for the preparation of the said cyanoalkyl piperazines in good yield.

It is a further object of this invention to provide N,N'-bis-(cyano-n-alkyl)-piperazines which can be hydrogenated to give N,N'-bis-(aminoalkyl)-piperazines of sufficient stability for use in the preparation of deeply dyeable, fiber-forming polycarbonamides.

Still further objects of the invention will appear hereinafter.

The objects of this invention are achieved by heating at least two molecular proportions of the omega-halogenonitrile of a normal fatty acid containing 4 or more carbon atoms with one molecular proportion of piperazine or a C-alkylated piperazine in the presence of two or more equivalents of an aqueous alkali, separating the resultant bis-(cyanolkyl)-piperazine and freeing it of impurities which interfere with its catalytic hydrogenation to the corresponding diamine.

The preparation of mono-nitriles containing the 4-cyano-n-butyl group, such as 4-cyanobutyl-aminobutane, $CNC_4H_8NHC_4H_9$, have been previously described by Gassenmeier and Hrubesch (German Patent 875,523 (1949)). This process is carried out by heating 5-chlorovaleronitrile with excess primary or secondary amine under pressure and liberating the amine hydrochloride obtained as a primary product by treatment with a strong alkali. Methods for the production of dinitriles by heating piperazine derivatives with halogenonitriles are not described.

The preferred dinitriles of this invention are those in which the cyanoalkyl groups contain 4 to 8 carbon atoms. These are preferably produced by reactions involving omega-chloronitriles of normal fatty acids containing 4 to 8 carbon atoms, viz. 4-chloro-n-butylronitrile, 5-chlorovaleronitrile, 6-chlorocaponitrile and 7-chloroenanthonitrile. The preferred piperazines are unsubstituted piperazine or C-alkylated piperazines carrying up to two alkyl groups containing up to two carbon atoms per group. Of special interest because of its availability is 2,5-dimethyl piperazine.

Suitable alkalis for use in the process of this invention include the alkali metal carbonates, alkali metal hydroxides and alkaline earth hydroxides. Sodium carbonate is preferred because of its low cost and availability.

The reaction is carried out by refluxing the reaction mixture of the piperazine, chloronitrile, sodium carbonate and water for about two to ten hours. The temperature of the refluxing mixture is in the range 100°–125° C. Higher temperatures could be employed, if desired, to accelerate the reaction but this would necessitate use of an autoclave in which the reaction could be carried out under pressure. At least two molecular proportions of chloronitrile are required for each mole of piperazine but to obtain the best yields an excess of 5 to 10% of the theoretical amount of chloronitrile should be employed. One equivalent of sodium carbonate or a slight excess thereof should be employed for each molecular proportion of chloronitrile. Preferably sufficient water is used to give a sodium carbonate solution having a concentration of around 30%. A small amount of potassium iodide may be added as a reaction catalyst but this is not essential and good results are obtained in its absence. If desired the chloronitrile may be added gradually to the refluxing mixture of the other agents. Good mechanical agitation is desirable to facilitate reaction.

When the reaction is complete, the product may be isolated by various methods involving decantation of phases, crystallization, solvent extraction, distillation, etc. In order to obtain a product suitable for utilization as an intermediate for the preparation of diamines, it must be substantially free of unreacted chlorovaleronitrile or other products, which act as catalyst poisons, or otherwise interfere with the catalytic hydrogenation process. It has been discovered that this can be done by steaming the crude product, crystallizing the nitrile hydrate and subsequently blowing with preheated nitrogen gas. This treatment removes organic impurities and water to give anhydrous dinitrile which can be employed directly in the hydrogenation process.

The N,N'-bis-(4-cyano-n-butyl)-piperazine of this invention is a substantially colorless, crystalline product which melts at approximately 25° C. when pure and boils at 180°–4° C. at 0.1 to 0.3 mm. pressure. It readily absorbs water forming a crystalline monohydrate whose melting point is approximately 70° C. The nitrile titrates as a weak monoacid base. The solubility of the hydrate in water is 4.5% at 4° C., 7% at 30° C. and at temperatures approaching the boiling point of water, it dissolves readily in an equal weight of water. On hydrogenation with Raney cobalt, it gives the diamine, N,N'-bis-(5-aminopentyl)-piperazine.

N,N'-bis-(4-cyanobutyl)-2,5-dimethyl piperazine is a substantially colorless solid melting at approximately 67° C. and boiling at 175°–180° C. under a pressure of 0.1 to 0.3 mm. It does not form a stable hydrate with water as is the case with the unsubstituted cyanobutyl piperazine described above. On hydrogenation, it gives the diamine, N,N'-bis-(5-aminopentyl)-piperazine.

The invention may be better understood in greater detail from the following examples describing the preparation of N,N'-bis-(4-cyano-n-butyl)-piperazines. These examples are given for illustrative purposes only and are not intended to limit the invention.

Example 1

A charge of 44.6 g. piperazine having a purity of 96.5% (0.50 mole), 58.3 g. anhydrous sodium carbonate (0.55 mole) and 160 ml. water was placed in a 1-liter 3-necked flask equipped with a reflux condenser, an efficient stirrer and a graduated dropping funnel. The charge was then heated to reflux with constant agitation and 136 g. of 5-chlorovaleronitrile having a purity of 95% (1.1 moles) added gradually at an approximately constant rate over a period of 30 minutes. Refluxing and stirring were then continued for an additional 4.5 hours. The reaction mixture at this state consisted of two liquid phases.

The liquid phases were decanted without cooling and the upper organic layer mixed with an equal weight of water, heated to dissolve and cooled in an ice bath to crystallize the product which separated as the monohydrate. When crystallization appeared to be complete after about one hour, the crystals were filtered, washed with 40 ml. water and air-dried to constant weight. The mother liquor was then evaporated to about 25% of its original volume and filtered to recover a second crop of crystals. The mother liquor from the latter crystals was evaporated to constant weight in a steam bath under partial vacuum. The residue (6.5 g.) was dissolved in an equal weight of hot water and a third crop of crystals recovered. The total product weighed 124.3 g. This amounts to a yield of the monohydrate of N,N'-bis-(4-cyanobutyl)-piperazine equivalent to 93.7% of the theoretical based on piperazine or 85.2% on a chlorovaleronitrile basis. The crude monohydrate melted in the range 60° to 69° C.

Example 2

Eighty-nine pounds of piperazine (96.5%), one hundred seventeen pounds sodium carbonate and 30 gals. wash liquid from a previous preparation of N,N'-bis-(4-cyanobutyl)-piperazine were placed in a steel reactor equipped with agitation, means for heating, a reflux condenser and essential piping for filling and draining. The solution was heated to boiling and two hundred thirty pounds 95% 5-chlorovaleronitrile pumped in over a period of approximately 30 minutes. The mixture was then refluxed for two hours and decanted hot discarding the dense brine layer. The crude product layer was pumped to a crystallization vessel and mixed with an equal weight of water. This mixture was heated to boiling and partially distilled to remove a small amount of water, unreacted chlorovaleronitrile and other impurities. After this, the mixture was cooled, filtered and the crude crystals washed with water. The filtrate was discarded but the washings were retained for use as the solvent for subsequent batches of piperazine and sodium carbonate. The crystals were then melted and run into a packed tower, in which the melt was subjected to countercurrent scrubbing with hot dry nitrogen to remove water and traces of volatile impurities. The dehydrated N,N'-bis-(4-cyanobutyl)-piperazine melts at approximately 25° C. and is free of impurities which interfere with catalytic hydrogenation with Raney cobalt to the corresponding diamine, N,N'-bis-(5-aminopentyl)-piperazine.

Example 3

A reactor was charged with 171 parts of 2,5-dimethyl piperazine, 432 parts of 90% chlorovaleronitrile, 318 parts of sodium carbonate, 1000 parts of water and 2 parts of potassium iodide as catalyst. The mixture was heated at reflux for two hours. After cooling to room temperature, the mixture was extracted with benzene and the benzene extract distilled under reduced pressure to isolate the product. An approximately 90% yield of N,N'-bis-(4-cyanobutyl)-2,5-dimethyl piperazine was obtained. The product distilled at 175° to 180° C. at a pressure of 0.1 to 0.3 mm. and melted at 66° to 67° C.

The N,N'-bis-(omega-cyano-n-alkyl)-piperazines of this invention in which the cyanoalkyl group contains 4 to 8 carbon atoms are of outstanding value as intermediates for the preparation of diprimary amines containing two tertiary amino groups which have sufficient stability for use in the preparation of polycarbonamides. They are particularly valuable in the production of modified, fiber-forming polycarbonamides which exhibit high sensitivity to acid dyes.

This utility may be demonstrated by hydrogenating the dinitriles in the presence of an active cobalt catalyst, such as Raney cobalt. The resultant diamine is reacted with an equimolar proportion of adipic acid in alcohol solution to give a crystalline salt. A 50% aqueous solution of 47.5 parts of the above salt is placed in an evaporator with 4000 parts of a 50% aqueous solution of hexamethylenediammonium adipate and 22 parts of acetic acid. The mixture is evaporated to a total solids content of 75% and then, while hot, charged into a nitrogen-purged autoclave. During the first half hour of the polymerization cycle, the system is closed while the temperature is raised to 200° C. A pressure of 250 pounds per square inch is maintained for an additional five hours while the temperature is slowly increased to 280° C. Pressure is then reduced to atmospheric over a 1½ hour period, the temperature being permitted to rise to 285° C. After maintaining this temperature for about 2 hours, the polymerization product is extruded as a ribbon, quenched with water and cut into flake.

The copolymer is steam spun in the apparatus described in United States Patent No. 2,571,975 through a 13-hole spinneret maintained at 294° C. and collected as a 120 denier, 13 filament yarn at a wind-up speed of 1206 yards per minute. After being drawn 3 times its extruded length with the apparatus described in United States Patent No. 2,289,232, it is observed to have a tenacity of 5.0 grams per denier and a 25% elongation.

Knit tubing prepared from the above yarn is dyed by immersion for one hour at the boil in an aqueous bath containing the following:

2.0% Anthraquinone Green (C.I. 1078)
2.0% Sodium lauryl sulfate
10.0% Ammonium sulfate The bath to fabric ratio is maintained at 50:1 (bath:fabric). The fabric is then scoured in water containing 2.0% sodium lauryl sulfate for 15 minutes at 75° C., rinsed and dried. It is observed to have been dyed a dark green.

When a similar tubing of polyhexamethyleneadipamide yarn is subjected to the same dyeing technique as described above, it acquires only a light shade of green.

Diamines prepared from N,N-bis-(omega-cyano-n-alkyl)-piperazines in which the cyanoalkyl groups contain less than four carbon atoms are too unstable for use in the preparation of modified polycarbonamides as described above. When N,N'-bis-(2-aminopropyl)-piperazine, prepared by hydrogenation of N,N'-bis-(2-cyanoethyl)-piperazine, was employed in the modified polycarbonamide preparation described above it was found to be of insufficient stability for preparation of a satisfactory polymer. Decomposition was indicated by the low viscosity of the modified polymer and the fact that it contained an abnormally high content of titratable amine.

Diamines prepared by hydrogenation of N,N-bis-(4-cyanobutyl) alkylamines are also too unstable for use in the preparation of modified polycarbonamides of the type described. Experiments demonstrated that over 50% of N,N-bis-(5-aminopentyl)-n-butylamine was decomposed when employed in place of the N,N'-bis-(5-aminopentyl)-piperazine in the polycarbonamide preparation previously described.

Having described my invention in detail, I claim:

1. A process for the preparation of N,N'-bis-(omega-cyano-n-alkyl)-piperazines in which the omega-cyano-n-alkyl groups contain 4 to 8 carbon atoms by reaction of a piperazine, selected from the group consisting of piperazine and C-alkyl substituted piperazines carrying 1 to 2 alkyl groups containing 1 to 2 carbon atoms, with, at least, two molecular proportions of an omega-halogenonitrile of a normal fatty acid containing 4 to 8 carbon atoms in the presence of water and approximately one equivalent of an alkali for each molecular proportion of the halogenonitrile, said alkali being selected from the group consisting of alkali metal hydroxides, alkali metal carbonates and alkaline earth hydroxides.

2. The process of claim 1 in which the piperazine is unsubstituted piperazine, the omega-halogenonitrile is 5-chloro-n-valeronitrile and the alkali is sodium carbonate.

3. The process of claim 2 in which the piperazine is 2,5-dimethyl piperazine.

4. A process for the preparation of N,N'-bis-(4-cyano-n-butyl)-piperazine by the reaction of one molecular proportion of piperazine with 2.1 to 2.2 molecular proportions of 5-chloro-n-valeronitrile and an aqueous solution containing approximately one equivalent of sodium carbonate for each molecular proportion of said chloronitrile and having a concentration of around 30%, aforesaid reaction being carried out in the temperature range of about 100–125° C.

5. The process of claim 4 in which the N,N'-bis-(4-cyano-n-butyl)-piperazine is separated from the reaction mixture by decanting the upper product phase from the hot mixture, crystallizing as the monohydrate from a hot solution of this phase in an equal weight of water after steaming to remove volatile impurities, and subjecting the molten crystals of the hydrated product to a current of preheated nitrogen gas to remove water and any remaining impurities, said separated product being of satisfactory purity for catalytic hydrogenation.

6. A process for the preparation of N,N' - bis - (4 - cyano-n-butyl) - 2,5-dimethyl-piperazine by the reaction of one molecular proportion of 2,5-dimethyl-piperazine with 2.1 to 2.2 molecular proportions of 5-chloro-n-valeronitrile and an aqueous solution containing approximately one equivalent of sodium carbonate for each molecular proportion of said chloronitrile and having a concentration of around 30%, aforesaid reaction being carried out in the temperature range of about 100–125° C.

References Cited in the file of this patent

UNITED STATES PATENTS

| 2,277,158 | Sexton et al. | Mar. 24, 1942 |

FOREIGN PATENTS

| 641,597 | Germany | Feb. 11, 1937 |
| 690,466 | Great Britain | Sept. 26, 1951 |

OTHER REFERENCES

Whitmore et al.: Jour. Am. Chem. Soc., vol. 66, pages 725–731 (1944).

Untermohler: Jour. Amer. Chem. Soc., vol. 63, pages 156–159 (1941).